April 22, 1952          P. S. DICKEY          2,593,660

INSTRUMENT FOR MEASURING EFFICIENCY OF TURBOGENERATORS

Filed Jan. 9, 1948          2 SHEETS—SHEET 1

*INVENTOR.*
PAUL S. DICKEY
BY Raymond W. Junkins
*ATTORNEY*

April 22, 1952  P. S. DICKEY  2,593,660
INSTRUMENT FOR MEASURING EFFICIENCY OF TURBOGENERATORS
Filed Jan. 9, 1948  2 SHEETS—SHEET 2

INVENTOR.
PAUL S. DICKEY
BY
*Raymond W. Junkins*
ATTORNEY

Patented Apr. 22, 1952

2,593,660

UNITED STATES PATENT OFFICE 2,593,660

INSTRUMENT FOR MEASURING EFFICIENCY OF TURBOGENERATORS

Paul S. Dickey, East Cleveland, Ohio, assignor to Bailey Meter Company, a corporation of Delaware Application January 9, 1948, Serial No. 1,464

4 Claims. (Cl. 73—112)

1

This invention relates to the art of power plant instruments and is particularly directed to providing an instrument for measuring and visually exhibiting the value of variables, or the effective results of variables, in the operation of power producing or utilizing apparatus.

One object is to provide an efficiency meter for continuously measuring and advising the operating efficiency of power producing or utilizing apparatus.

Another object is to provide a measuring instrument for continuously interrelating the input and the output of power producing or utilizing apparatus.

Still another object is to provide measuring means for continuously advising the relation between heat input and electrical output of a steam turbine-electric generator power unit.

A further object is to provide a continuous visual guide for the operation of an electrical generating unit in terms of efficiency of operation.

Further objects will become apparent from a study of the drawing and specifications as well as the claims appended thereto.

Figure 1:
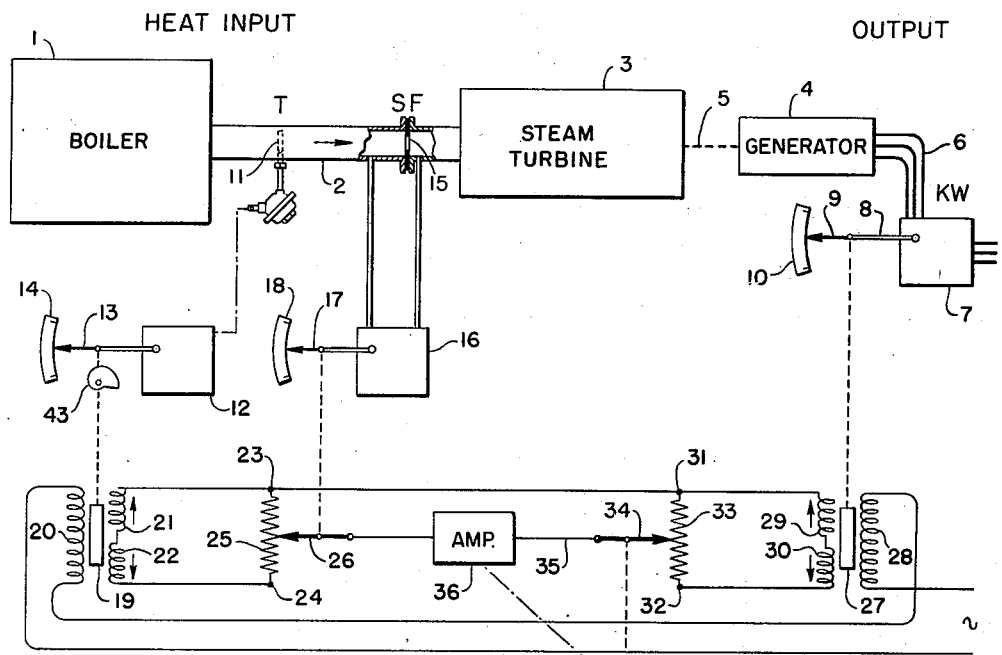
Fig. 1 illustrates in diagrammatic manner a preferred form of my invention as applied to a vapor generator and heat power converter.

Referring now particularly to Fig. 1, I show therein a vapor generator 1 delivering steam through a conduit 2 to a steam turbine 3 which drives an electric generator 4 through a shaft 5. The output of the generator 4 is diagrammatically indicated as electric conductors 6 to which is related a kw. meter 7 in known manner to provide a measure of electric output. The kw. meter 7 is arranged to continuously position an element 8 so that a pointer 9, carried by the element 8 relative to a scale 10, will continuously advice the value of kilowatt output of the generator 4.

For determining the heat input to the turbogenerator 3, 4 whose efficiency is to be ascertained, I provide in the conduit 2 a temperature measuring unit 11 which may take the form of the resistance element of a resistance thermometer 12 arranged to continuously position an arm 13 relative to a scale 14 in terms of temperature (T) of the steam supplied by the vapor generator 1.

2

Located in the conduit 2 is an orifice 15 for creating a pressure differential varying with rate of steam flow. A steam flow meter 16 is connected across the orifice 15 in known manner and continuously positions an arm 17 relative to a scale 18 to advise the value of steam flow (SF) in either volume rate or weight rate passing through the conduit 2.

Those familiar with this art will appreciate that the total heat input to the turbine 3, in any unit of time, comprises the volume or weight of steam that passed to the turbine in the unit of time multiplied by the B. t. u. content of each pound of steam at the pressure and temperature conditions then existing. Inasmuch as steam pressure is usually maintained substantially constant at the outlet of the boiler 1, and furthermore that relatively wide variations in steam pressure values result in relative minor variations in B. t. u. content per pound of the steam, steam pressure fluctuation may for all practical purposes be disregarded. For example, superheated steam at a temperature of 700 F. and a pressure of 650 p. s. i. a. has a total heat content of 1348.0 B. t. u. At 700 F. and 550 p. s. i. a. the total heat is 1354.0 B. t. u. while at 700 F. and 750 p. s. i. a. the total heat is 1341.8 B. t. u. Thus a pressure variation of ±100 p. s. i. from 650 p. s. i. a. results in only about .5% deviation in total heat content of the steam. On the other hand the heat content per pound of steam varies rather widely and in non linear functional relation with the temperature of the steam and particularly so when the steam is superheated.

Figure 2:
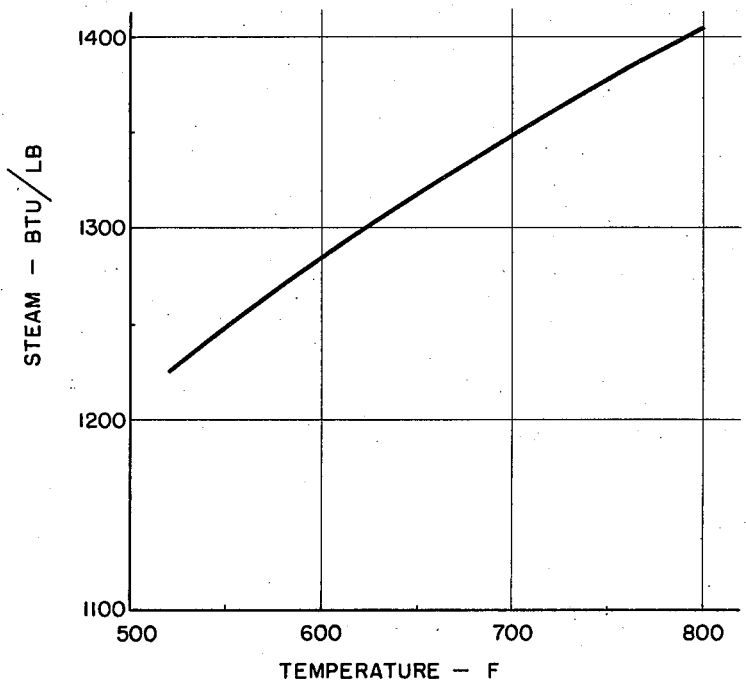
Fig. 2 is a graph of variable conditions pertinent to the system of Fig. 1.

I have assumed, for purposes of description, that the present steam turbine is designed to operate with steam supplied a 650 p. s. i. a. and 700 F. Referring now to Fig. 2 I show therein a graph of the heat content of such steam for variations in total temperature, assuming that the pressure remains invariable. It will be observed that at design conditions of 700 F. the superheated steam may have a heat value of 1348 B. t. u. per lb. If the pressure remains constant at 650 p. s. i. a., or varies only slightly either way, the heat content of each pound of steam will vary directly with temperature but the functional relation is non-linear. The nonlinearity of the curve is however so slight that for most operating conditions it may be disregarded. In other words, if steam temperature departs only slightly either way from design temperature, the relation between temperature and heat content will be so nearly a linear relationship that it will be within acceptable accuracy limits. Inasmuch as I have illustrated and will describe means for correcting for non-linearity in the relation between steam temperature and heat content I have mentioned its existence and have illustrated in Fig. 2 the relationship in its true form as taken from present day steam tables. Furthermore under other operating conditions of temperature and pressure of the steam the non-linearity of the relationship may be greater than in the present example.

By my present invention I provide a continuous guide and a permanent record of the efficiency of operation of the turbine and electric generator as an operating unit. This gives an overall operating efficiency picture without breakdown as to where the losses or inefficiencies may take place. For example, I disregard heat or efficiency losses in the turbine, condenser losses, as well as windage and other generator losses. I provide an overall picture from heat input to the steam turbine to final salable kilowatt output of the electric generator. Through my invention I continuously advise the operating condition of the unit either in terms of B. t. u./kw. or in terms of per cent efficiency between heat input and heat output where the latter figure is the heat equivalent of the kilowatt output.

Referring again to Fig. 1 it will be seen that I provide a calculating circuit wherein steam flow rate is continually modified by temperature of the steam to produce an effect representative of heat input and the latter is then continuously divided by an effect representative of kw. output so that an answer is obtained which may be read in terms of B. t. u./kw.

The temperature representative element 13 is arranged to vertically position a core piece 19 coupling a continuously energized primary winding 20 with a pair of bucking secondary windings 21, 22 connected in series. Connected across the terminals 23, 24 of the secondary windings is a resistance 25 having a movable contact arm 26 which is positioned by and with the steam flow responsive element 17. Thus the positioning of the element 19 is representative of B. t. u. per lb. of steam, this being proportional to the steam temperature T corrected for non-linearity by the cam 43, and the positioning of the contact arm 26 is representative of steam flow SF. Voltage between the terminal 23 and the contact 26 is representative of $$\phi(T) \times SF$$

(where $\phi$ represents the function to convert temperature to B. t. u. per lb. of steam).

Referring now to the right hand side of the diagram it will be noted that a similar adjustable transformer includes a movable core element 27 positioned by the kw. responsive arm 8 relative to an energized primary 28 and a pair of bucking secondary windings 29, 30. Across the terminals 31, 32 of the secondary windings is a resistance 33 having a movable contact arm 34.

The continuously energized primaries 20, 28 are connected in series (aiding) across the power source and are therefore equally sensitive to voltage variations of the source.

The elements 21, 22, 25, 29, 30 and 33 are included in a balanceable network which is in balance when the voltage between the terminal 23 and the contact arm 26 is equal to the voltage between the terminal 31 and the contact arm 34. In balance condition there is no voltage drop between the contact arms 26 and 34 which are joined by a conductor 35 containing an amplifier and motor control circuit 36. Upon unbalance of the network in one direction or the other a voltage unbalance exists between the contact arms 26 and 34 and to this voltage the amplifier 36 is sensitive as to phase and magnitude. The amplifier and motor control circuit 36 is arranged for energizing a motor 37 and controlling its direction and speed of rotation. The circuit 36 as well as the motor 37 may be of the type disclosed and claimed in the copending application of Anthony J. Hornfeck Serial No. 693,290 filed August 27, 1946, now Patent 2,544,790, granted March 13, 1951.

When the network is in balance no voltage exists in the conductor 35 and consequently the amplifier and motor control circuit 36 is quiescent and the motor 37 is unmoving. Under that condition any voltage existing between the terminal 23 and the contact arm 26 is equal to and counteracting the voltage existing between the terminal 31 and the contact arm 34. If either the element 19 or the contact 26 is changed in position then the voltage between the terminal 23 and the contact 26 will vary in amount as compared to the voltage between the terminal 31 and the contact 34 thus unbalancing the network and producing a voltage unbalance in the conductor 35. Similarly a positioning of either the element 27 or the contact 34 may produce an unbalance. Inasmuch as the amplifier and motor control circuit 36 is sensitive to the direction and magnitude of any unbalance in the conductor 35 for producing directional rotation of the motor 37 it will be apparent that, from a balanced condition, any movement of one or more of the elements 19, 26 or 27 will result in a movement of the motor 37.

The motor 37 is connected through means 38 to position contact 34 for restoring balance of the network following any unbalance thereof. At the same time the motor 37 acts through the element 39 for positioning an indicating recording arm 40 movable relative to a scale 41 and a revoluble chart 42. The overall operation of the network is to continually solve the equation Position of arm 34=

$$T \times \frac{SF}{kw.}$$

to provide an answer in terms of B. t. u. per kw. which will be continuously indicated by the arm 40 relative to the index 41 and continuously recorded upon the chart 42.

Although I have mentioned that the relationship between temperature and heat content of the steam (Fig. 2) is linear within acceptable accuracy limits over a normal operating range I have provided at 43 a cam arranged to affect the positioning of the element 19 by the arm 13 to correct for the absolute non-linear relation between temperature and heat content of the steam. It will be noted that the cam 43 is shown diagrammatically between the element 13 and the element 19 so that the indication of actual steam temperature by the arm 13 relative to the scale 14 is unaffected by the cam and thus the reading on the scale 14 is a reading of actual temperature.

The cam 43 not only is useful in correcting for non-linear relationship between temperature and the heat content of the steam but produces a resulting positioning of the element 19 in terms of B. t. u. per pound of the steam at the existing temperature thereof.

Figure 3:
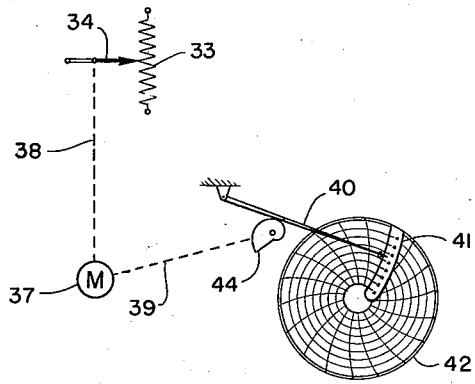
Fig. 3 is a modification of a portion of Fig. 1.

Referring now to Fig. 3 I show therein a modification of Fig. 1 wherein I have interposed a cam 44 in the linkage 39 which interconnects the motor 37 with the indicator arm 49. The purpose of the cam 44 is to cause a movement of the arm 49 relative to the index 41 and the chart 42 in terms of overall efficiency which may be read in per cent and is obtained by dividing output by input. The resulting indication is the reciprocal of the indication produced in Fig. 1, with the additional conversion of kw. in the terms of B. t. u., so that B. t. u. output is continuously divided by B. t. u. input to obtain a visual manifestation of overall heat efficiency of the turbo-generator.

Figure 4:
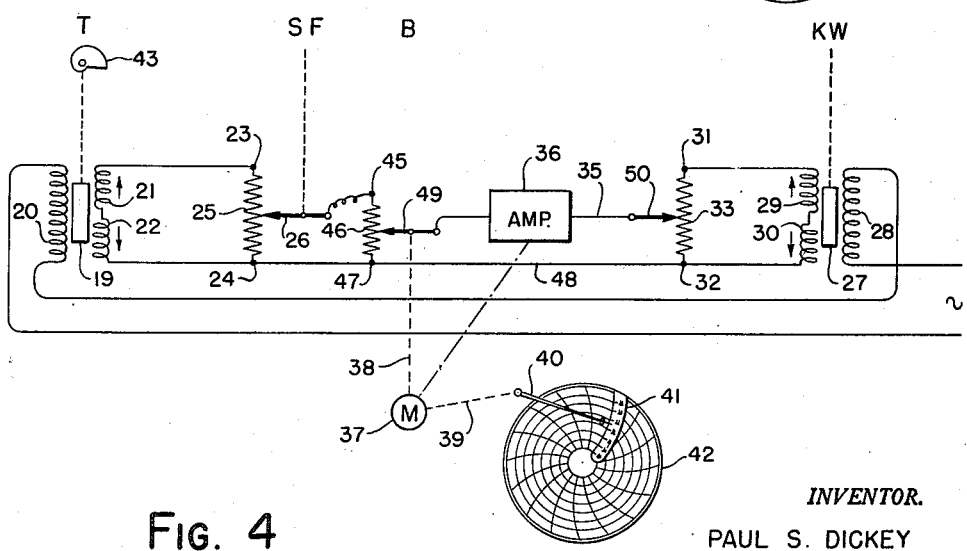
Fig. 4 is another embodiment of my invention comprising a modification of a part of Fig. 1.

In Fig. 4 I show a somewhat different balanceable network than that which I have described in connection with Fig. 1. Herein the calculating network itself is so arranged that the positioning of the arm 49 relative to the scale 41 may be directly in terms of efficiency or kw. output (B. t. u. equivalent) divided by B. t. u. input.

The contact arm 26 is connected as at 45 to one end of a resistance 46 whose other end is connected at 47 to a conductor 48 which joins the terminals 24, 32. The balancing motor 37 is arranged to position the movable contact arm 49 along the resistance 46. At the other end of the conductor 35 is a contact arm 50 movable along the resistance 33 manually for range or calibrating purposes.

The arrangement of Fig. 4 is such that a voltage between the points 49, 47 counteracts the voltage between 50, 32 when the network is in balance. The calculating operation continuously performed is as follows:

19×26×49=27 (positions of elements)
Let B represent the position of balance arm 49
Then $T \times SF \times B = $ kw.
Input$\times B$=Output $$B = \frac{\text{Output}}{\text{Input}} = \text{Per Cent Efficiency}$$

In performing this mathematical procedure it is to be understood that the proper constants and conversion factors may be incorporated in the cams or resistances and other electrical elements so that (SF×T) will provide an effect representative of B. t. u. input per unit of time and similarly kw. will provide an effect representative of B. t. u. output of the generator 4 per unit of time. The result will be in terms of B. t. u. output divided by B. t. u. input or per cent efficiency on a heat basis for the steam turbine 3 and electric generator 4 as a combined operating unit. Thus in Fig. 4 the indicator 40 will directly indicate, relative to the scale 41, in terms of per cent efficiency as was produced in a different manner by the arrangement of Fig. 3.

While I have chosen to illustrate and describe certain preferred embodiments of my invention it will be understood that these are by way of example only and not to be considered as limiting.

What I claim as new and desire to secure by Letters Patent of the United States, is:

1. A turbo-generator efficiency meter including in combination, a steam flow meter for measuring the rate of steam supplied to the turbine, a temperature measuring meter determining temperature of the steam supplied, a kw. meter measuring the electrical output of the electric generator, a first movable core transformer whose core is positioned by the temperature measuring meter in accordance with the steam temperature corrected for non-linearity between temperature and heat content of the steam, a first resistance in circuit with the secondary of said first movable core transformer with a movable contactor positioned along its length by the steam flow meter in accordance with the magnitude of the steam flow rate to the end that the voltage appearing across either portion of the divided resistance is proportional to the heat input to the steam turbine, a second movable core transformer whose core is positioned by the kw. meter in accordance with the electric output of the generator, a second resistance with a movable contactor in circuit with the secondary of said second transformer, a phase sensitive motor control amplifier in circuit between the two movable contactors and connected portions of each divided resistance, and motor means under control of the phase sensitive motor control amplifier to move said last mentioned movable contactor to maintain equal voltage drops between the two portions of the resistances in the circuit while simultaneously exhibiting the rebalance movement as an indication of the ratio between input and output of the turbo-generator unit.

2. A turbo-generator efficiency meter including in combination, a steam flow meter for measuring the rate of steam supplied to the turbine, a temperature measuring meter determining temperature of the steam supplied, a kw. meter measuring the electric output of the electric generator, a first movable core transformer whose core is positioned by the temperature measuring meter in accordance with the steam temperature corrected for non-linearity with heat content, a first resistance in circuit with the secondary of said first movable core transformer with a movable contactor positioned along its length by the steam flow meter in accordance with the magnitude of the steam flow rate to the end that the voltage appearing across either portion of the divided resistance is proportional to the heat input to the steam turbine, a circuit formed of one portion of the first divided resistance and its contactor and a resistance across which appears a voltage proportional to the heat input to the turbine, a second movable core transformer whose core is positioned by the kw. meter in accordance with the electric output of the generator, a second resistance in circuit with the secondary of said second transformer with a movable contact, a phase sensitive motor control amplifier in circuit with a contactor moving along the resistance carrying the voltage proportional to heat input, the movable contactor of the second resistance, and the resistance portions they each select from their respective resistances, and a motor means under control of the amplifier which positions the contactor along the input heat resistance while causing exhibiting means to indicate directly in terms of percentage efficiency.

3. A turbo-generator efficiency meter including in combination, means measuring the temperature of the steam supplied the turbine, means measuring the flow rate of steam supplied the turbine, means measuring the kw. output of the generator, means including a transformer having a core movable under control of the temperature measuring means for establishing a voltage representative of the temperature, means under control of the flow rate of the steam measuring means for selecting a portion of the temperature voltage which is representative of the total heat of the steam, means including a transformer having a core movable under control of the kw. measuring means for establishing a voltage representative of the generator output, an electrical network for opposing the portion of the temperature voltage selected against the kw. established voltage, means sensitive to the network voltage unbalance, potentiometer means under control of the sensitive means for rebalancing the network, and means also under control of the sensitive means manifesting direction and extent of the rebalance motion in terms of overall efficiency of the combined turbine and generator.

4. A turbo-generator efficiency meter including, means measuring the steam temperature, means measuring the flow rate of steam supplied the turbine, means measuring the kw. output of the generator, means including a transformer having a core movable under control of the steam temperature measuring means for establishing a corresponding voltage, means compensating said voltage for the non-linear relation between the steam temperature and its heat content, means by which the means measuring the flow rate of steam selects a portion of the compensated temperature voltage which is representative of the B. t. u. content of the steam, means including a transformer having a movable core controlled by the kw. output measuring means for establishing a corresponding voltage representative of the power output, a network including means for combining in opposition the selected and kw. output voltages, and means responsive to unbalance in said last mentioned voltages for continually rebalancing the network, said last mentioned means including devices for simultaneously manifesting the rebalancing movement as a determination of the ratio between the input to and the output of the turbo-generator unit.

PAUL S. DICKEY.

REFERENCES CITED

The following references are of record in the file of this patent:

UNITED STATES PATENTS

| Number | Name | Date |
| --- | --- | --- |
| 2,293,403 | Razek | Aug. 18, 1942 |
| 2,357,403 | Xenis et al. | Sept. 12, 1944 |
| 2,501,377 | Cherry | Mar. 21, 1950 |